United States Patent
Ooga

(12) 
(10) Patent No.: US 6,424,408 B1
(45) Date of Patent: Jul. 23, 2002

(54) WAKE TURBULENCE DETECTING SYSTEM

(75) Inventor: Yasuisa Ooga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/895,316

(22) Filed: Jul. 2, 2001

(30) Foreign Application Priority Data

Aug. 31, 2000 (JP) ........................................ 2000-262164

(51) Int. Cl.[7] .............................. G01P 3/36; G01S 13/00; G01N 21/00; G06K 9/00
(52) U.S. Cl. ................... 356/28.5; 342/36; 356/342; 382/107
(58) Field of Search .................. 356/28.5, 342, 356/141.1, 139.04, 139.08, 455, 456; 382/107, 103; 342/104–117, 36–40

(56) References Cited

U.S. PATENT DOCUMENTS

| | | | | |
|---|---|---|---|---|
| 3,693,015 A | * | 9/1972 | Funk, Jr. ..................... | 250/209 |
| 3,984,686 A | * | 10/1976 | Fletcher et al. ............. | 250/339 |
| 4,195,931 A | * | 4/1980 | Hara .......................... | 356/346 |
| 4,373,808 A | * | 2/1983 | Pell et al. .................... | 356/152 |
| 5,000,567 A | * | 3/1991 | Fleshner ..................... | 356/28.5 |
| 5,657,009 A | * | 8/1997 | Gordon ....................... | 340/968 |
| 5,724,040 A | * | 3/1998 | Watnick ....................... | 342/26 |
| 5,751,830 A | * | 5/1998 | Hutchinson ................. | 382/103 |

FOREIGN PATENT DOCUMENTS

| | | |
|---|---|---|
| JP | 09318743 | 12/1997 |
| JP | 10170646 | 6/1998 |

* cited by examiner

*Primary Examiner*—Thomas H. Tarcza
*Assistant Examiner*—Brian Andrea
(74) *Attorney, Agent, or Firm*—Oblon, Spivak, McClelland, Maier & Neustadt, P.C.

(57) ABSTRACT

Reducing blind spots of a laser radar observing wake turbulence is required for detecting efficiently the wake turbulence which appears behind the main wings of an aircraft and affects the flight of other aircraft.

A first laser radar a and second laser radar each emit a laser beam from different positions. A signal processing device produces wake turbulence information based on the reception signal of the first and second laser radar. Further, the signal processing device specifies wake turbulence information for producing display data either by making a composite of wake turbulence information of two laser radar whose observation areas do not overlap each other or by selecting the larger value of wake turbulence information from two laser radars whose observation areas overlap each other and produces display data for indicating wake turbulence information on monitor display based on the specified wake turbulence information.

12 Claims, 12 Drawing Sheets

(a)

(b)

WAKE TURBULENCE DETECTING SYSTEM

BACKGROUND OF THE INVENTION

1. Field of the Invention

The present invention relates to a wake turbulence detecting system detecting by means of laser radar deployed in an airport wake turbulence which appears behind main wings of an aircraft during takeoff or landing and continues to exist along the trail of the aircraft.

2. Description of the Background Art

Wake turbulence is a turbulence winding up vortexes rotating in opposite directions to each other, generated backward of right and left main wings of a flying aircraft. As for the scale of wake turbulence, a diameter of a vortex may extend to a few hundred feet, deteriorating the controllability of the following aircraft entering the trail. When wind is weak, wake turbulence continues to exist in consonance with a trail of an aircraft for a few minutes. Lifetime of the wake turbulence gets longer especially early in the morning when wind is slight and strong radiational cooling occurs. On the other hand, when wind is strong, the wake turbulence may spread, resulting in short lifetime but possible drift downstream from where it started, affecting aircraft flying in other sky areas. In consideration of existence of such wake turbulence, in main airports where many aircraft take off or land aircraft traffic control is carried out. Requests to shorten the time interval between takeoffs or landings are getting stronger to meet the increasing demand for air cargo delivery.

For such requests, laser radar for watching the wake turbulence may be installed in airports and when it is received that there is no wake turbulence the following aircraft can be allowed to take off or land by aircraft traffic control even though a few minutes have not yet passed after the takeoff or landing of preceding aircraft. FIG. 12 is a figure which shows an airport where a laser radar is deployed. In FIG. 12, reference number 30 denotes a runway. Reference number 31 denotes an aircraft. Reference number 32 denotes a wake turbulence generated backward of aircraft 31. Reference number 33 denotes a laser radar installed in the vicinities of a runway. In addition, FIG. 13 is a block diagram showing constitution of a conventional wake turbulence detecting system. In FIG. 13, reference number 34 denotes a scanning control part which generates scanning control signal for controlling the irradiating direction and the irradiating gun elevation of laser beam. Reference number 35 denotes a beam transmitter-receiver unit which emits a laser beam based on a scanning control signal and detects the reflected laser beam reflected by dust or particles in the atmosphere. Reference number 36 denotes a signal processing device which detects wake turbulence from a reflected laser beam via the beam transmitter-receiver unit. Reference number 37 denotes wake turbulence detecting part which detects wake turbulence from a reflected laser beam and generates wake turbulence information. Reference number 38 denotes a monitor display which displays the wake turbulence information generated by wake turbulence detecting part 37.

FIG. 14 is a block diagram which shows detailed constitution of beam transmitter-receiver unit 35. In FIG. 14, reference number 39 denotes a beam transmit-receive circuit which excites a laser and generates a reception signal including Doppler information indicating the behavior of dusts or solids in the atmosphere and the intensity of the received reflected laser beam. Reference number 40 denotes beam enlarge-reduce device, which enlarges the width of a laser beam from beam transmit-receive circuit 39 and reduces the width of a reflected laser beam.

Referring now to FIGS. 12, 13 and 14, operation of the wake turbulence detecting system is described. In FIG. 13, beam transmitter-receiver unit 35 composing laser radar 33 emits a laser beam toward the direction of runway 30, namely the flight course traced by aircraft 31 during takeoff. Scanning control part 34 outputs scanning control signal for changing the direction and the gun elevation angle of laser beam to beam transmitter-receiver unit 35, controlling the beam to scan over the predetermined irradiation area. The transmitted laser beam from beam transmitter-receiver unit 35 is reflected by aerosols such as dusts or solids. The reflected laser beam reflected by dusts or solids returns toward the laser radar and is received by beam transmitter-receiver unit 35. Beam transmitter-receiver unit 35 generates a reception signal including Doppler information indicating the behavior of dusts or solids in the atmosphere and the reception intensity information of the reflected signal indicating the intensity of the reflected laser beam and outputs them to wake turbulence detecting part 37 of signal processing device 36.

Wake turbulence detecting part 37, based on a reception signal transmitted by beam transmitter-receiver unit 35 of laser radar 33, detects the velocity and the direction of the wind at predetermined constant intervals (e.g. about 30 meters). Furthermore, wake turbulence detecting part 37, based on scanning control signal transmitted by scanning control part 34, detects the velocity and the direction of the wind for each direction the beam is pointed. In addition, wake turbulence detecting part 37, based on the velocity and the direction of the wind along beam transmitting direction and along that of each direction, finds the center position indicating the wake turbulence position, the diameter of a vortex indicating the scale of wake turbulence vortex, and the intensity of wake turbulence, then composing wake turbulence information. Furthermore, wake turbulence detecting part 37 generates display data for indicating the wake turbulence information on monitor display 38 and outputs them to monitor display 38. Monitor display 38 indicates wake turbulence information such as an outbreak position, a scale and intensity of the wake turbulence based on shown data. In addition, among devices composing a wake turbulence detecting system, laser radar 33 is arranged in the vicinities of runway 30 and signal processing device 36 and monitor 38 are installed inside the control tower.

In the control tower, control person in charge, based on wake turbulence information indicated on monitor display 38, confirms whether there is a wake turbulence or not. If it is confirmed that wake turbulence does not exist or has already disappeared, the control person in charge promptly directs the following aircraft to take off or land on without waiting for a few minutes defined as minimum time interval for takeoffs or landings of aircraft. Thus, the wake turbulence detecting system enables the control person in charge to watch the wake turbulence from its outbreak to its extinction so that aircraft control is made more efficient.

By the way, there remains a problem that should be solved to execute safer aircraft traffic control by means of a wake turbulence detecting system as mentioned above. For example, though the wake turbulence detecting system shows nonexistence of wake turbulence, if it is unclear whether wake turbulence really does not exist or exists but merely cannot be detected, highly trustworthy aircraft traffic control can not be afforded. Therefore, it desirable that there are no blind spots which disturb the detection of wake turbulence.

As described above, wake turbulence detecting system detects Doppler components from the behavior of dusts and solids floating in the atmosphere and so detects the direction and the velocity of wake turbulence vortex. In order to receive the Doppler components of the intensity (velocity) of the wake turbulence vortex efficiently, It is desirable to deploy the laser radar at a position where laser beam can be oriented in the direction parallel to the vortex direction. In other words, as shown in FIG. 7, laser radar 33 can observe wake turbulence 32 well when aircraft 31 is located on the point A. However, it becomes difficult to receive wake turbulence 32 when aircraft 31 changes the flight course after takeoff and arrives at the point B. Thus, the blind spot of the laser radar observing wake turbulence is determined in accordance with the position of the laser radar and the flight course that the aircraft traces.

The present invention is proposed to solve the aforementioned problem and it is an object of the present invention to provide a wake turbulence detecting system which makes it possible to reduce the blind spot in observing wake turbulence.

SUMMARY OF THE INVENTION

Wake turbulence detecting system according to the present invention comprises a first laser radar located close to a runway, said first laser radar including a laser transmitter-receiver unit emitting laser beam toward an aircraft taking off or landing on said runway and receiving reflected laser beam reflected back by the aerosol which is floating in the atmosphere that said laser beam irradiated and which scatters said laser beam, and a scanning control part controlling the irradiating direction of the laser beam from said laser transmitter-receiver unit; a second laser radar located at a position differing from that of said first laser radar, said second laser radar including a laser transmitter-receiver unit emitting laser beam toward an aircraft taking off or landing on said runway and receiving reflected laser beam reflected back by aerosol which is floating in the atmosphere that said laser beam irradiated and which scatters said laser beam, and a scanning control part controlling the irradiating direction of the laser beam emitted from said laser transmitter-receiver unit; and a signal processing device producing first wake turbulence information including the scale, the wind velocity and the birth place of the wake turbulence in the area where said first laser beam is irradiated, and producing second wake turbulence information including the scale, the wind velocity and the birth place of the wake turbulence in the area where said second laser beam is irradiated, and indicating the wake turbulence information of the area where the irradiation of said first and said second laser radar do not overlap each other by making a composite of said first and second wake turbulence information, and indicating the wake turbulence information of the area where the irradiation of said first and second laser radar overlap each other by comparing said first wake turbulence information with second wake turbulence information to select the one having a larger value.

Wake turbulence detecting system according to the present invention comprises a first laser radar located close to a runway, said first laser radar including a laser transmit-receive circuit which generates a laser beam irradiated to the atmosphere and which detects reflected laser beam reflected back by aerosol floating in the atmosphere, a beam enlarge-reduce device enlarging the width of laser beam output from said laser transmitter-receiver unit to adjust the irradiating direction of said laser beam and also reducing the width of said reflected laser beam, a laser transmitter-receiver unit having a beam isolator provided between said laser transmit-receive circuit and said beam enlarge-reduce device to switch the path of laser beam output from said laser transmitter-receiver unit, and a scanning control part producing scanning control signal to control the direction of laser beam output from said laser transmitter-receiver unit for controlling said beam enlarge-reduce device in response to said scanning control signal; second laser radar including a laser transmitter-receiver unit having beam enlarge-reduce device which enlarges the width of laser beam generated by said laser transmitter-receiver unit input after its path has been switched by said beam isolator and irradiates the laser beam to the atmosphere adjusting the irradiating direction and reduces the width of reflected laser beam to output it to laser transmit-receive circuit of said first laser radar, and a scanning control part producing scanning control signals to control irradiating direction of laser beam emitted by said laser transmitter-receiver unit and for controlling said beam enlarge-reduce device in response to said scanning control signal; a signal processing device producing wake turbulence information including the scale, the wind velocity and the position of the wake turbulence and producing indicating signal for indicating said wake turbulence information on monitor display; and a laser radar selecting part controlling said beam isolator based on aircraft position information and position information read from memory means storing blind spot information of said first and second laser beam and switching the source of the laser beam excited by said laser transmitter-receiver unit selectively between said first and second laser radar.

DESCRIPTION OF THE PREFERED EMBODIMENT

First Embodiment

Figure 1:
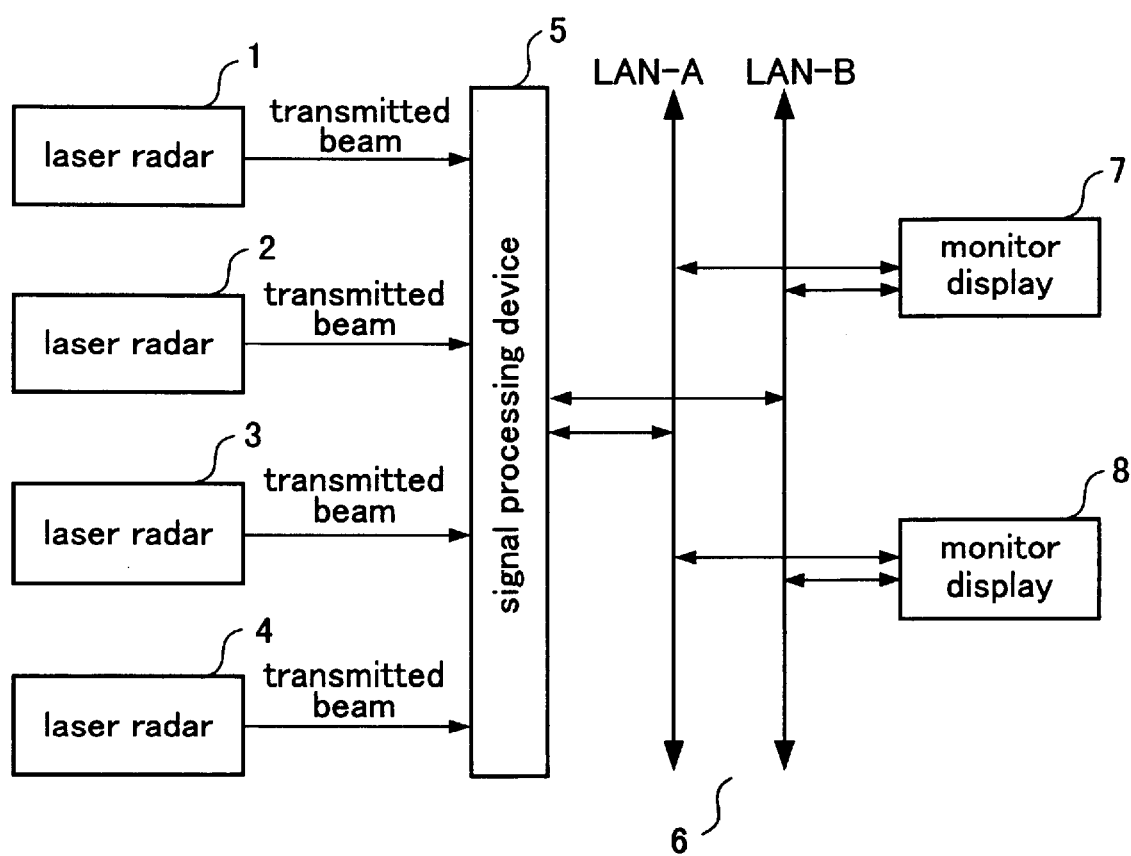
FIG. 1 is an illustration which shows constitution of the wake turbulence detecting system related to the present invention.

FIG. 1 is a block diagram which shows constitution of a wake turbulence detecting system related to the first embodiment of the present invention. In FIG. 1, reference number 1 denotes a first laser radar which is arranged in the vicinity of the first runway for emitting laser beam and receiving the reflected laser beam reflected back by aerosol in the atmosphere. Reference number 2 denotes a second laser radar arranged at a position differing from that of the first laser radar in the vicinity of the first runway same as the first laser radar. Reference number 3 denotes a third laser radar arranged in the vicinity of the second runway. Reference number 4 denotes a fourth laser radar arranged at a position differing from that of the third laser radar in the vicinities of the second runway same as the third laser radar. Reference number 5 denotes a signal processing device detecting the wake turbulence from the reflected laser beam output by each laser radar 1, 2, 3 and 4 and displaying wake turbulence on monitor display. Reference number 6 denotes LAN (Local Area Network) which transmits the display data output from signal processing device 5. Reference number 7 denotes a monitor display for displaying wake turbulence information over the first runway. Reference number 8 denotes a monitor display for displaying information on wake turbulence at the second runway.

Figure 2:
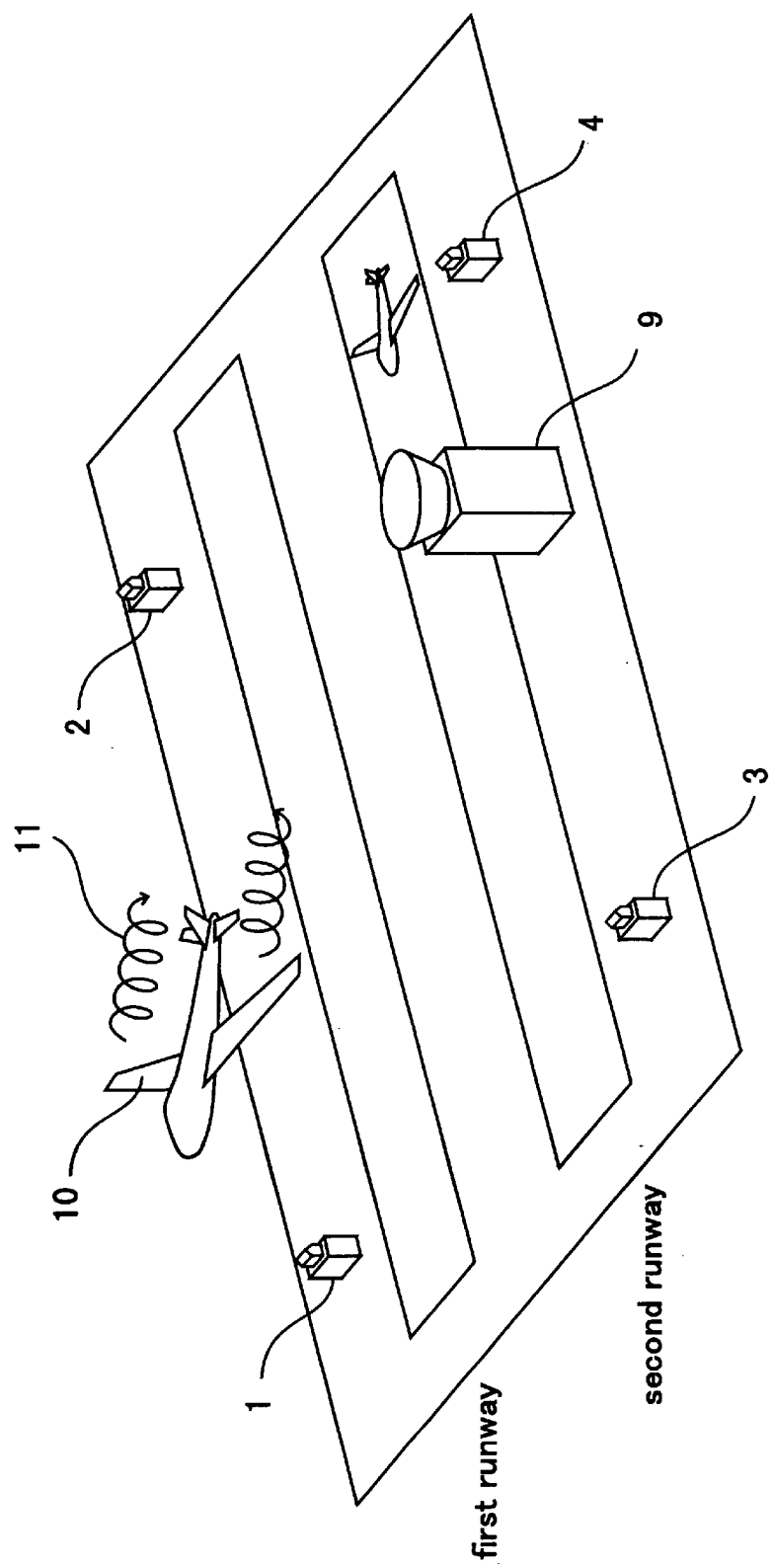
FIG. 2 is an illustration which shows the whole view of an airport where a laser radar is disposed.

FIG. 2 is a conception diagram which shows the airport provided with a wake turbulence detecting system. In FIG. 2, reference number 9 denotes a control tower executing aircraft traffic control. Reference number 10 denotes an aircraft which just took off from the first runway. Reference number 11 denotes a wake turbulence generated behind the aircraft 10. First laser radar 1 and second laser radar 2 are arranged along the first runway. Third laser radar 3 and fourth laser radar 4 are arranged along the second runway. Signal processing device 5 and monitors 7, 8 shown in FIG. 1 are provided inside the control tower 9.

Figure 3:
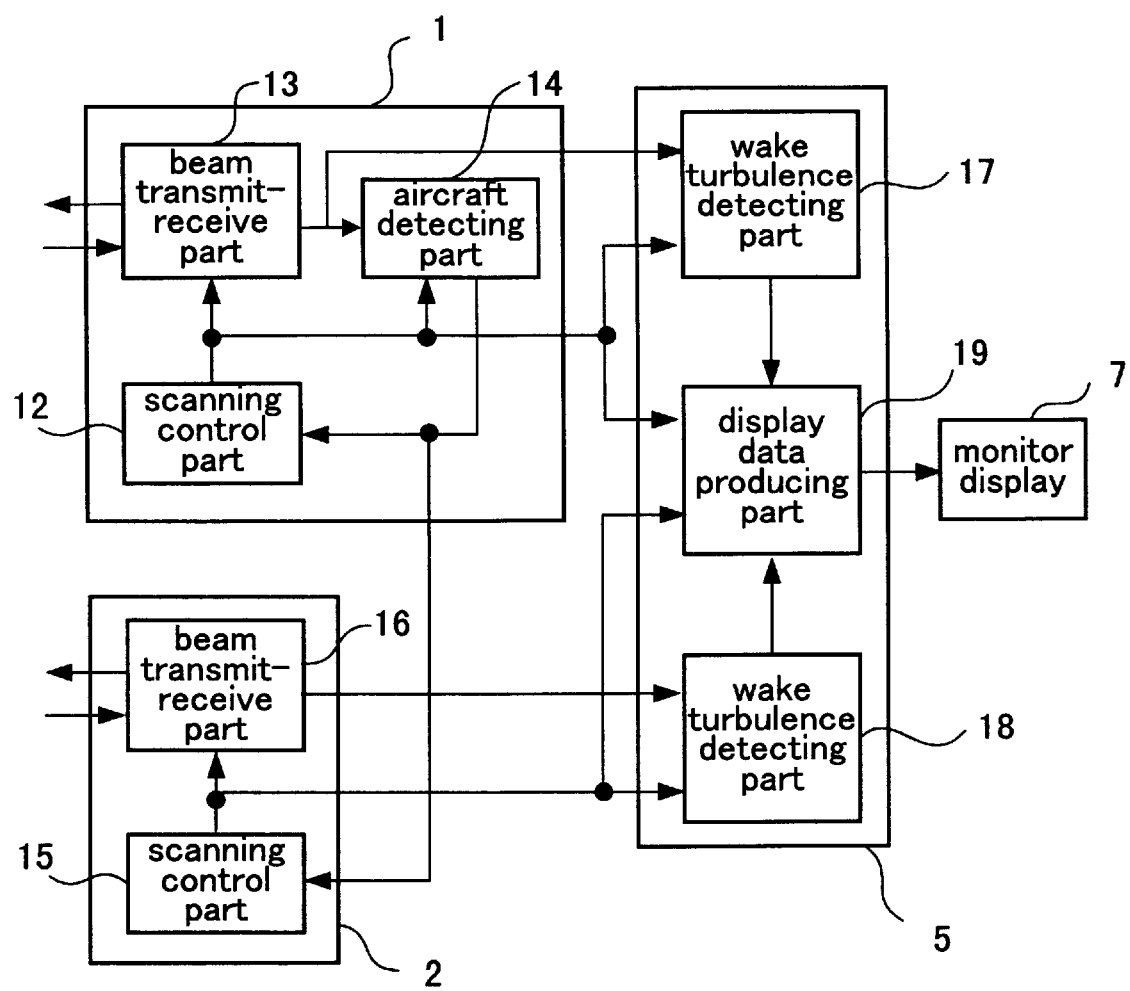
FIG. 3 is a block diagram which shows constitution of the wake turbulence detecting system related to the first embodiment of the present invention.

FIG. 3 is a block diagram which shows more precisely the constitution of the wake turbulence detecting system shown in FIG. 1. In FIG. 3, reference number 12 denotes a scanning control part which produces scanning control signal changing the irradiating direction and the irradiating gun elevation of a beam to be emitted and controls the beam scanning. Reference number 13 denotes a beam transmitter-receiver unit which emits a laser beam in response to scanning control signal transmitted by scanning control part 12 and receives a reflected laser beam reflected back by aerosol in the atmosphere. Reference number 14 denotes an aircraft position detecting unit which detects the position of an aircraft based on the reflected laser beam received by beam transmitter-receiver unit. First laser radar 1 is composed of scanning control department 12, beam transmitter-receiver unit 13 and aircraft position detecting part 14 as mentioned above. In addition, reference number 15 denotes a scanning control unit which produces scanning control signal changing the irradiating direction and the irradiating gun elevation angle of a beam to be emitted and controls the beam scanning. Reference number 16 denotes a beam transmitter-receiver unit which emits a beam laser in response to scanning control signal transmitted by scanning control part 15 and receives a reflected laser beam reflected back by aerosol in the atmosphere. Second laser radar 2 is composed of scanning control part 15 and beam transmitter-receiver unit 16.

In addition, reference number 17 denotes wake turbulence detecting part which detects the wake turbulence from a reflected laser beam transmitted by beam transmitter-receiver unit 13 and produces wake turbulence information. Reference number 18 denotes wake turbulence detecting part which detects the wake turbulence from a reflected laser beam transmitted by beam transmitter-receiver unit 16 of second laser radar 2 and produces wake turbulence information. Reference number 19 denotes display data producing unit which processes signals for wake turbulence information transmitted by wake turbulence detecting part 17, 18 and produces display data to make monitor display 7 display the wake turbulence information. Signal processing device 5 is composed of wake turbulence detecting part 17, wake turbulence detecting part 18 and display data producing part 19.

A description is made of operation of the wake turbulence detecting system related to the first preferred embodiment of the present invention. Scanning control department 12 of first laser radar 1 generates scanning control signal so that a beam scans a predetermined observation area sequentially. Scanning control part 12 outputs the scanning control signal to beam transmitter-receiver unit 13, aircraft position detecting department 14, wake turbulence detecting part 17 and display data making part 19. Beam transmitter-receiver unit 13, based on the scanning control signal transmitted by scanning control part 12, outputs laser beam from first laser radar 1 while adjusting the irradiating direction and the irradiating gun elevation angle of the laser beam to be emitted. The laser beam output by first laser radar 1 is reflected back by aerosol in the atmosphere, namely dusts or tiny solids floating in the atmosphere. The reflected laser beam reflected back by dusts or solids is input to beam transmitter-receiver unit 13 of first laser radar 1.

Beam transmitter-receiver unit 13 produces a reception signal converted to an electric signal giving Doppler information indicating the behavior of dusts or solids in the atmosphere and detected beam intensity information indicating the intensity of the reflected laser beam. The reception signal is output to aircraft position detecting part 14 and wake turbulence detecting part 17 of signal processing device 5. Wake turbulence detecting part 17 calculates the velocity and the direction of the wind at predetermined intervals along the beam transmission direction based on a reception signal output by beam transmitter-receiver unit 13. In addition, wake turbulence detecting part 17 decects the velocity and the direction of the wind in the direction determined by the scanning control signal from scanning control part 12. Wake turbulence detecting part 17, based on the velocity and the direction of the wind along beam transmitting direction and in each direction, detecting the diameter of the vortex indicating the scale of wake turbulence and the velocity of the wake turbulence and calculates on the basis of these and the position of the first laser radar the position of the wake vortex center and produces wake turbulence information including this and the prior three parameters.

Aircraft position detecting part 14 detects signals having a level at or above the threshold level at every predetermined point along beam transmission direction. In addition, aircraft position detecting part 14, based on scanning control signal transmitted from scanning control part 12, detects if the reception level exceeding the threshold level in each direction continues along beam transmitting direction and in adjacent directions over a predetermined range. Then, removing from consideration regions having a successive reception intensity exceeding the predetermined level over an area with clutter (a reflected signal from the ground or the buildings), position of the aircraft is calculated. Calculated aircraft position information is output to scanning control part 12 of first laser radar 1 and to scanning control part 15 of second laser radar 2.

For example, scanning control part 12 having an aircraft position information input by aircraft position detecting part 14 produces a scanning control signal for scanning a predetermined azimuth i.e. for example a range of ±5 degrees centered at the aircraft position. Receiving the scanning control signal, beam transmitter-receiver unit 13 adjusts the irradiating direction and irradiating gun elevation of the laser beam so that the predetermined range centered around the aircraft position is scanned by the beam. Thus, first laser radar 1 scans a beam uniformly over the predetermined observation area until a position of an aircraft is detected and it scans a beam intensively over the observation area centered around the aircraft after having specified the position of the aircraft.

Scanning control department 15 of second laser radar 2, based on aircraft position information transmitted by aircraft position detecting unit 14, produces scanning control signal for scanning over the predetermined area centered around the aircraft position. The scanning control signal is output to beam transmit-receive unit 16, turbulence detecting part 18 of signal processing device 5 and display data producing unit 19. Receiving the scanning control signal, beam transmitter-receiver unit 16 of the second laser radar 2 emits laser beam in the direction of the aircraft by adjusting the irradiating direction and the irradiating gun elevation angle of the laser beam for scanning over the predetermined range centered around the aircraft. Laser beam irradiated from second laser radar 2 is reflected back by aerosol in the atmosphere, namely dusts and the solids floating in the atmosphere. The laser beam reflected back by dusts or solids in the atmosphere is input to beam transmitter-receiver unit 16 of first laser radar 1.

Beam transmitter-receiver unit 16, based on the reflected laser beam input, produces a reception signal converted to an electric signal giving Doppler information indicating the behavior of dusts and solids in the atmosphere and beam intensity information indicating the reception intensity of the reflected laser beam. The reception signal is output to wake turbulence detecting part 18 of signal processing device 5. Wake turbulence detecting part 18 calculates the velocity and the direction of the wind from a reception signal output by beam transmitter-receiver unit 16 at every predetermined point along the beam transmission direction. Further, wake turbulence detecting part 18 calculates the velocity and the direction of the wind, based on the scanning control signal. Then, wake turbulence detecting part 18, based on the velocity and the direction of the wind along beam transmission direction for each direction, calculates the diameter indicating the scale of wake turbulence vortex and wind velocity of the wake turbulence on the basis of these and the position of the second laser radar calculates the position of the center of the wake vortex and produces the wake turbulence information including this and the prior three parameters. The wake turbulence information is output to display data producing unit 19.

Display data producing part 19 of signal processing device 5 transforms the position of "center of the wake vortex" calculated respectively on the basis of first and second laser radar 1, 2 to coordinates based on the runway end. It then make a composite of data on the wake turbulence, for example "the diameter of the wake turbulence vortex" and "the wind velocity of the wake turbulence vortex", of the area where the observation range of first and second laser radar 1, 2 has no overlap. On the other hand, it compares the wake turbulence information, for example "the diameter of the wake turbulence vortex" and "the wind velocity of the wake turbulence vortex" to select the one having a larger value as of the area where the observation range of first and second laser radar 1, 2 has overlap. Finally, the display data production unit determines the wake turbulence information including "the center position of wake turbulence" transformed to coordinates based on the runway end and "the diameter of the wake turbulence vortex" and "the wind velocity of the wake turbulence vortex" make a composite of from the one value of the areas where the observation ranges have no overlaps or selected from two values in the areas where the observation ranges have overlaps. The produced display data is output to display monitor 7 and displayed there.

Since the wake turbulence detecting system observes the wake turbulence using two laser radars, the sky area observable for wake turbulence is enlarged. On the other hand, since two laser radar observe an area which is a blind spot for one of them, blind spots caused due to the location of the laser radar or the flight course of the aircraft are diminished. Additionally, as the position and the scale of the wake turbulence is specified based on the information from the first and second laser radar, highly precise observation of the wake turbulence is made possible.

In the wake turbulence detecting system as mentioned above, both the first and second laser radar scan a beam over the observation area centered around the aircraft position. The wake turbulence detecting system as explained above in which the first or the second laser radar scans a beam intensively over the observation area centered around the aircraft position has advantages as follows; even if the aircraft has flown into blind area of one laser radar, the other laser radar catches the aircraft and continues observation for the wake turbulence and immediately detects the scale of the wake turbulence generated backward of the aircraft.

However, it is also required not only to observe the wake turbulence in the aircraft's vicinity, but also to observe the wake turbulence over a wider observation area of the runway and its surroundings. In such cases, it is effective for the first laser radar to scan a beam over the predetermined area and also for the second laser radar to scan a beam over the observation area centered around the aircraft position. Now, Referring to FIG. 4, wake turbulence system in which the first laser radar scans a beam over the predetermined area and the second laser radar scans a beam over the observation area centered around the aircraft position is described.

Figure 4:
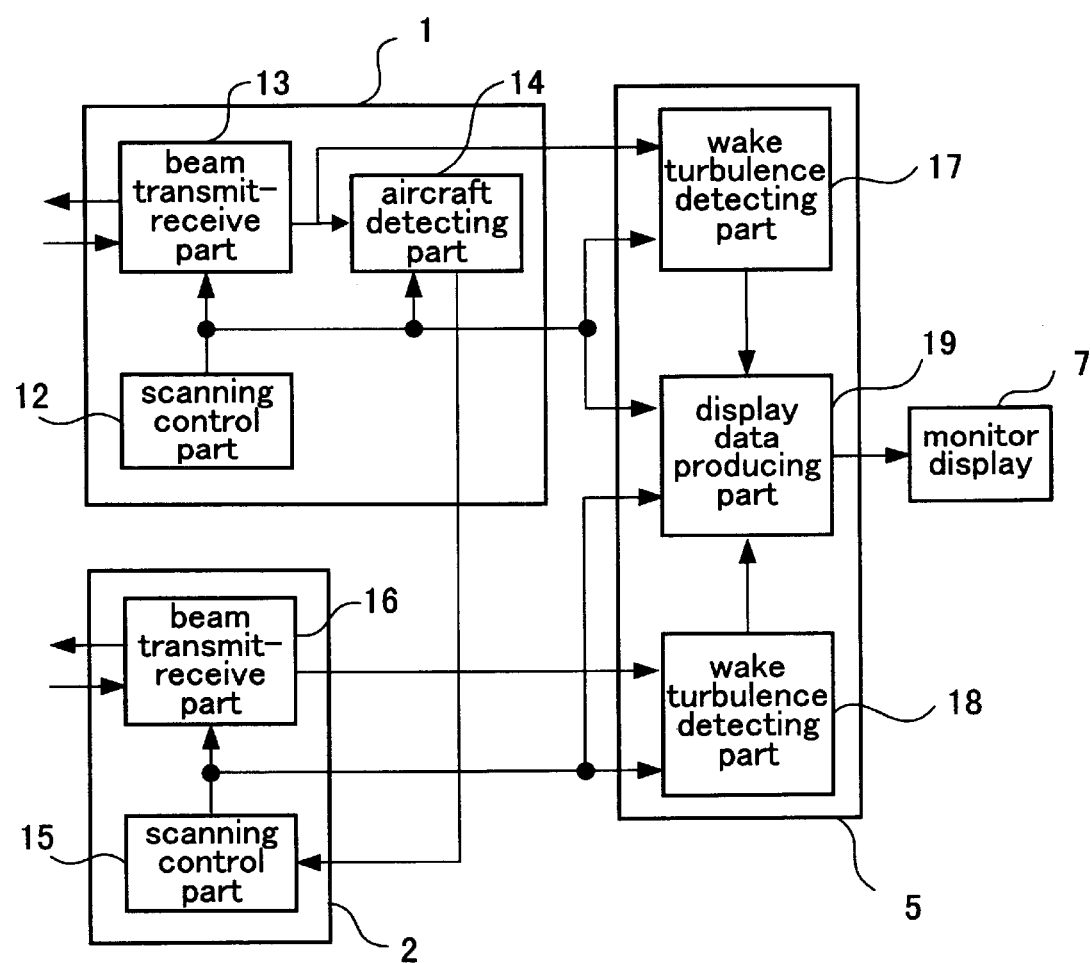
FIG. 4 is a block diagram which shows constitution of the wake turbulence detecting system related to the first embodiment of the present invention.

FIG. 4 is a block diagram which shows constitution of a wake turbulence detecting system related to the first embodiment of the present invention. The wake turbulence detecting system shown in FIG. 4 adopts the constitution approximately same as the wake turbulence detecting system shown in FIG. 3. However, as for this system, aircraft position information from aircraft position detecting part 14 provided in first laser radar 1 produces output only to scanning control part 15 of second laser radar 2 and not to scanning control part 12 of first laser radar 1, which makes a difference between the former and the present system.

Now, the operation of the system is described hereinafter.

Since the sequential scanning operation of the first laser radar over a predetermined observation area, the detecting operation of the wake turbulence from the reflected laser beam reflected back by dusts or solids in the atmosphere and the detecting operation of the aircraft position are the same as that of the wake turbulence detecting system shown in FIG. 3, and explanations are not given here.

First laser radar 1 keeps scanning a beam in the same way as before after having detected the aircraft position. On the other hand, scanning control part 15 of second laser radar 2 to which the aircraft position information is transmitted from aircraft position detecting part 14, based on said information, produces a scanning control signal for scanning a beam over the predetermined arc centered around the aircraft position. The scanning control signal is output to beam transmitter-receiver unit 16, turbulence detecting part 18 of signal processing device 5 and display data producing part 19. Receiving the scanning control signal, beam transmitter-receiver unit 16 of second laser radar 2 irradiates a laser beam toward the aircraft direction to scan over the predetermined area centered around the aircraft, adjusting the irradiating direction and the irradiating gun elevation angle of the laser beam.

In the wake turbulence detecting system shown in FIG. 4 as explained above, first laser radar 1 for scanning a beam over the predetermined observation area detects the aircraft position and controls second laser radar to scan a beam over the predetermined area centered around the aircraft. Therefore, a wake turbulence detecting system which is the combination of first laser radar 1 observing a comparatively large area and second laser radar 2 observing an area centered around the aircraft position is provided.

Figure 5:
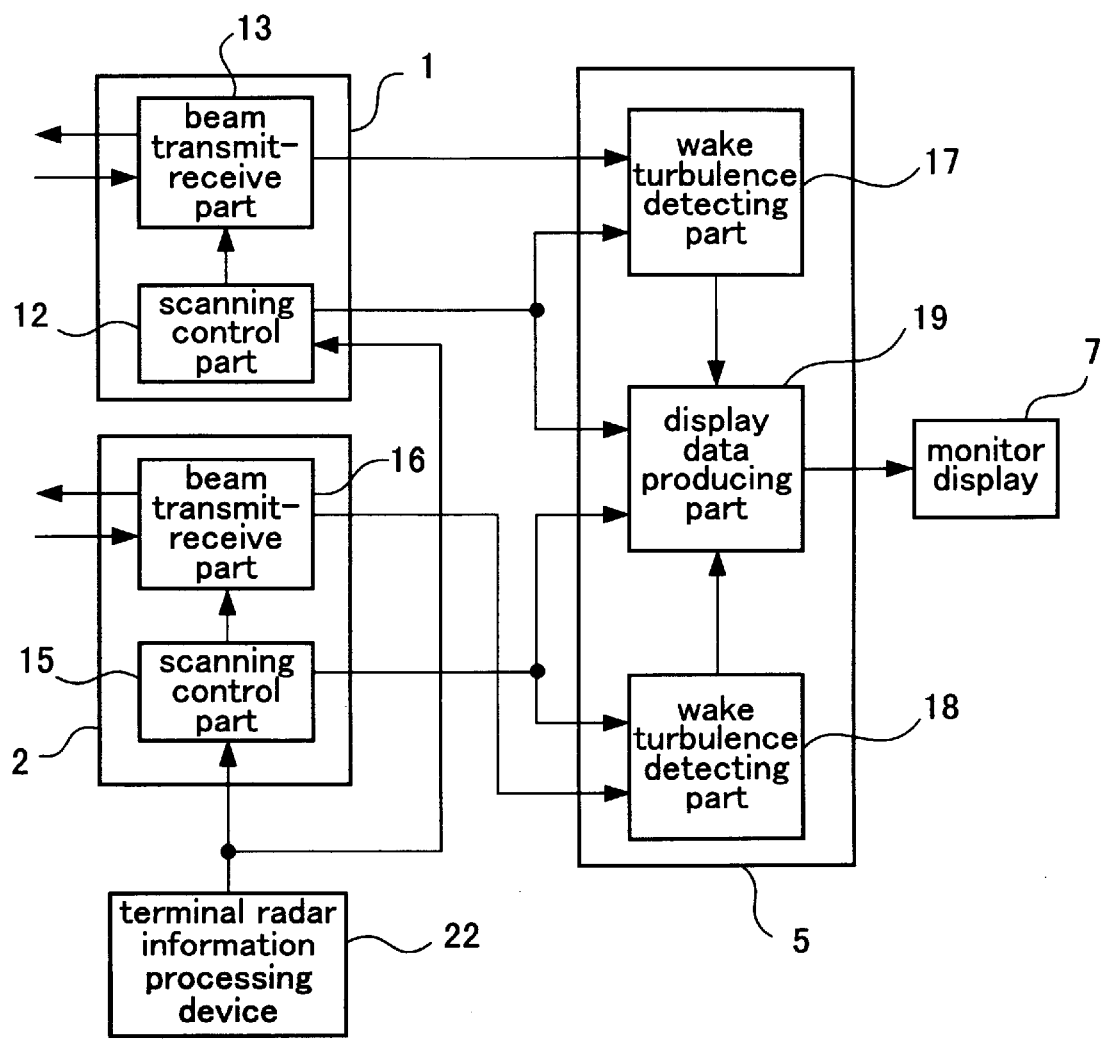
FIG. 5 is a block diagram which shows constitution of a wake turbulence detecting system related to the first embodiment of the present invention.

Since the wake turbulence detecting system shown in FIGS. 3, 4 as mentioned above observes wake turbulence using two laser radars, it has an advantage that blind spots where the wake turbulence cannot be observed are made smaller than in the case of observing it by a single laser radar. In addition, since the wake turbulence information about the area where the observing range of the two laser radar do not overlap is make a composite of and the wake turbulence information about the area where the observing range of the two laser radar overlap is compared so as to select the larger value among them, the scale and the position of the wake turbulence is specified more precisely. Further, since two laser radar scan beams over the predetermined observation area centered around the aircraft position, even though the aircraft flies into a blind spot of the one laser radar, the other laser radar is capable of continuing the observation. Besides, the conditions about outbreak, continuation, extinction or etc. concerning the wake turbulence centered around the aircraft are recognized very precisely. On the other hand, if one of the laser radar scans a beam over a predetermined area and the other scans a beam over a observation area centered around the aircraft position, it is made possible that while the former observes the generating condition of the wake turbulence centered around the aircraft, the latter observes the wake turbulence of wider sky area above the airport and its surroundings. In addition, in the wake turbulence detecting system as explained above, aircraft position detecting part 14 provided in first laser radar 1 calculates the aircraft position and almost same results come from obtaining aircraft position information from the radar for catching aircraft position provided in the airport. FIG. 5 is a block diagram which shows the constitution of a wake turbulence detecting system. In FIG. 5, reference number 22 denotes a terminal radar information processing device for acquiring aircraft position information from a terminal radar of an airport. In addition, in FIG. 5, as for the reference number the same as shown in FIG. 3, the explanation of equivalent or corresponding parts are omitted. The wake turbulence detecting system shown in FIG. 5 differs from the one shown in FIG. 3 on account of the aircraft position detecting part 14 being changed into terminal radar information processing device 22.

The operation of the system is described hereinafter.

In FIG. 5, terminal radar information processing device 22 acquires aircraft position information from a terminal radar deployed in the airport. Terminal radar information processing device 22 outputs acquired aircraft position information to scanning control part 12 of first laser radar 1 and scanning control part 15 of second laser radar 2. Scanning control part 12, based on aircraft position information from terminal radar information processing device 22, generates a scanning control signal for scanning a beam over a predetermined azimuth i.e. for example a range of ±5 degrees across the aircraft position. Each scanning control signal generated is respectively output to beam transmitter-receiver unit 13. Scanning control part 15 also generates scanning controls signal the same as scanning control part 12. Each scanning control signal generated is respectively output to beam transmitter-receiver unit 16.

Figure 6:
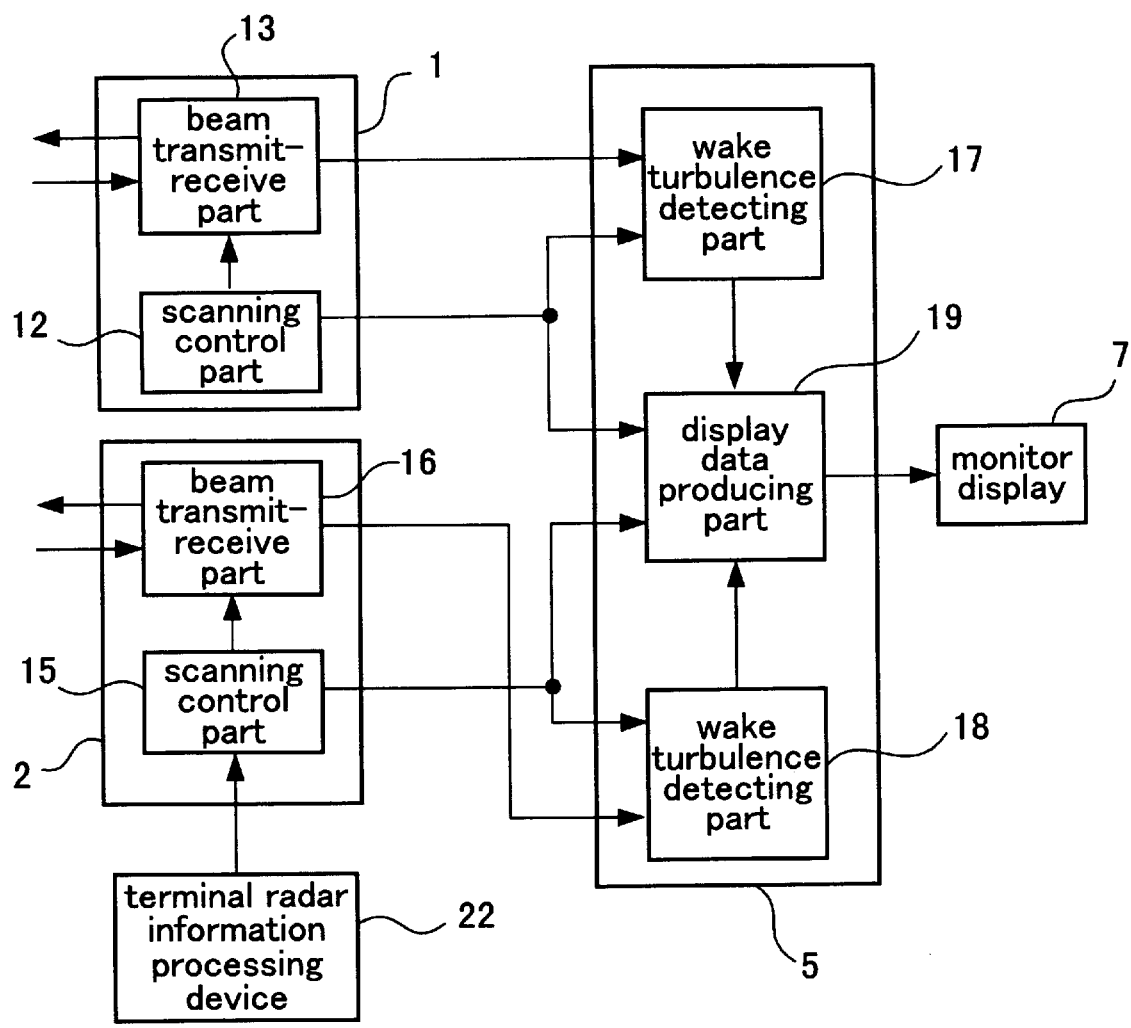
FIG. 6 is a block diagram which shows constitution of a wake turbulence detecting system related to the first embodiment of the present invention.

Receiving the scanning control signal, beam transmitter-receiver unit 13, 16 each adjusts the irradiation direction and the irradiating gun elevation angle of the laser beam for scanning beams over a predetermined area centered around the aircraft position. Beam transmitter-receiver unit 13, 16 that received a reflected laser beam reflected back by dusts or solids in the atmosphere generates reception signal and outputs them to wake turbulence detecting part 17 of signal processing device 5 and 18. Since the wake turbulence detecting part 17 and 18 and the processing contents of display data producing part 19 are the same as shown in FIG. 3, explanations are omitted. In addition, if only second laser radar 2 scans a beam in an observation area centered around the aircraft position, it is preferable to adopt a process supplying the aircraft position information acquired by terminal radar processing device 22 only to scanning control part 15 of second laser radar 2 as shown in FIG. 6.

In addition, above mentioned wake turbulence detecting system is provided with a display data producing part which produces display data by selecting data having a larger value from the wake turbulence information transmitted by wake turbulence detecting part 17, 18 in the case of wake turbulence information of observation areas covered by two laser radar. However, if the observation areas overlap, display data may alternatively be generated by means of wake turbulence information from a predetermined laser radar.

Figure 7:
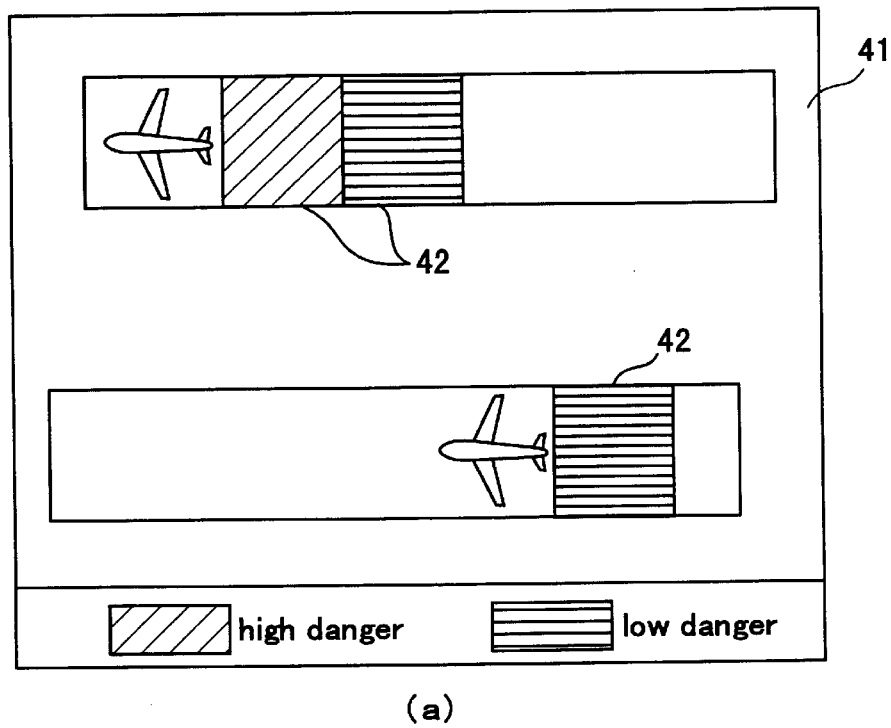
FIG. 7 is a figure which shows an image example of the screen of monitor display provided in the wake turbulence detecting system related to the present invention.
Figure 7:
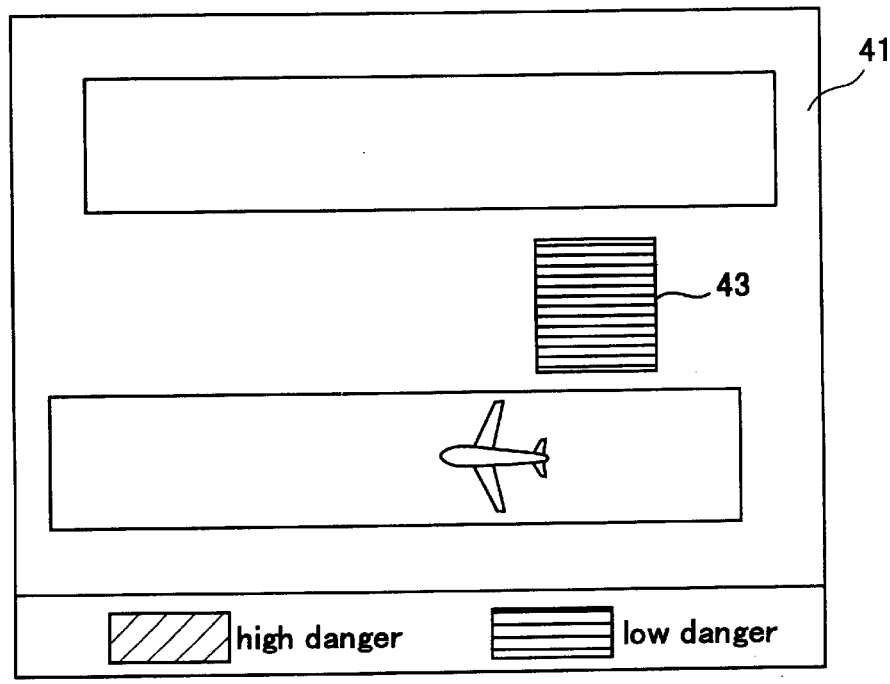

The wake turbulence detecting system as described above displays wake turbulence information to monitor display as explained below, providing it to the control person in charge. FIG. 7 is a figure which shows an example of a picture displayed on the monitor display of a wake turbulence detecting system related to the present invention. In FIG. 7, reference number 41 denotes a monitor screen displaying generated display data based on wake turbulence information. Reference number 42 denotes a mark showing wake turbulence. Reference number 43 denotes a mark showing wake turbulence after a predetermined expiration of time interval. As shown in FIG. 7($a$), signal processing device 5 produces an display signal by means of a process matching wake turbulence position to airport map in order to display the observed wake turbulence position at the corresponding point on airport map. An airport map is displayed on monitor screen 41 based on said display signal so that a mark indicating the existence of the wake turbulence is displayed at the corresponding point on airport map. Therefore, control person in charge can recognize easily the outbreak position of the wake turbulence.

In addition, signal processing device 5 compares the size of a taking off or landing aircraft registered beforehand with the scale of wake turbulence to determine the degree of danger. For example, in the case of high danger red mark is displayed on monitor display 41 and in the case of low danger yellow mark is displayed as a warning signal. As for the warning signal, since the menace degree is determined according to the size of the aircraft which gave birth to the wake turbulence, the size of the following aircraft versus the wake turbulence and the current scale of the wake turbulence, more effective aircraft traffic control is made possible. For example, though a certain scale of wake turbulence is generated, if the size of the following aircraft is large, takeoff or landing of the aircraft may be permitted as usual without suffering any deleterious effect. However, though the existing wake turbulence is small but the following aircraft is small, air traffic control should carefully be done. Thus the system determines the degree of danger from the size of the aircraft and the scale of the wake turbulence and indicates a warning signal, which is of great help for control person to make right judgments so that a more effective aircraft traffic control is realized.

Signal processing device 5, based on the latest weather data input from outside sources, forecasts a position and a scale variation of the wake turbulence with the passage of the time, and displays the result of the forecast on the monitor display. For example, FIG. 7(b) shows wake turbulence 42 displayed on the runway at the upper portion of the monitor screen and blown by the wind to move its position near the runway at the bottom of the screen while diminishing in scale. In addition, with the passage of time, as the scale of the wake turbulence 43 is reduced more in comparison with that of the wake turbulence 42, displayed mark indicating degree of danger turns to yellow from red. Thus the signal processing device 5, based on the wake turbulence information and the latest weather data input from outside, forecasts the position and the scale variation of the wake turbulence with the passage of time and updates the position of the wake turbulence displayed on the screen and said warning signal. Therefore, danger, scale, and position of the wake turbulence are displayed in real time from its outbreak to extinction.

Second Embodiment

The wake turbulence detecting system related to the first embodiment detects the wake turbulence by means of both first laser radar 1 and second laser radar 2. The wake turbulence detecting system detecting wake turbulence by means of two laser radar, has an advantage that even though the aircraft flies into the blind spot of one laser radar, the other laser radar catches the aircraft making it possible to detect wake turbulence. However, keeping the blind area of each laser radar in memory beforehand, radar that detects wake turbulence may be switched according to the position of an aircraft.

Figure 8:
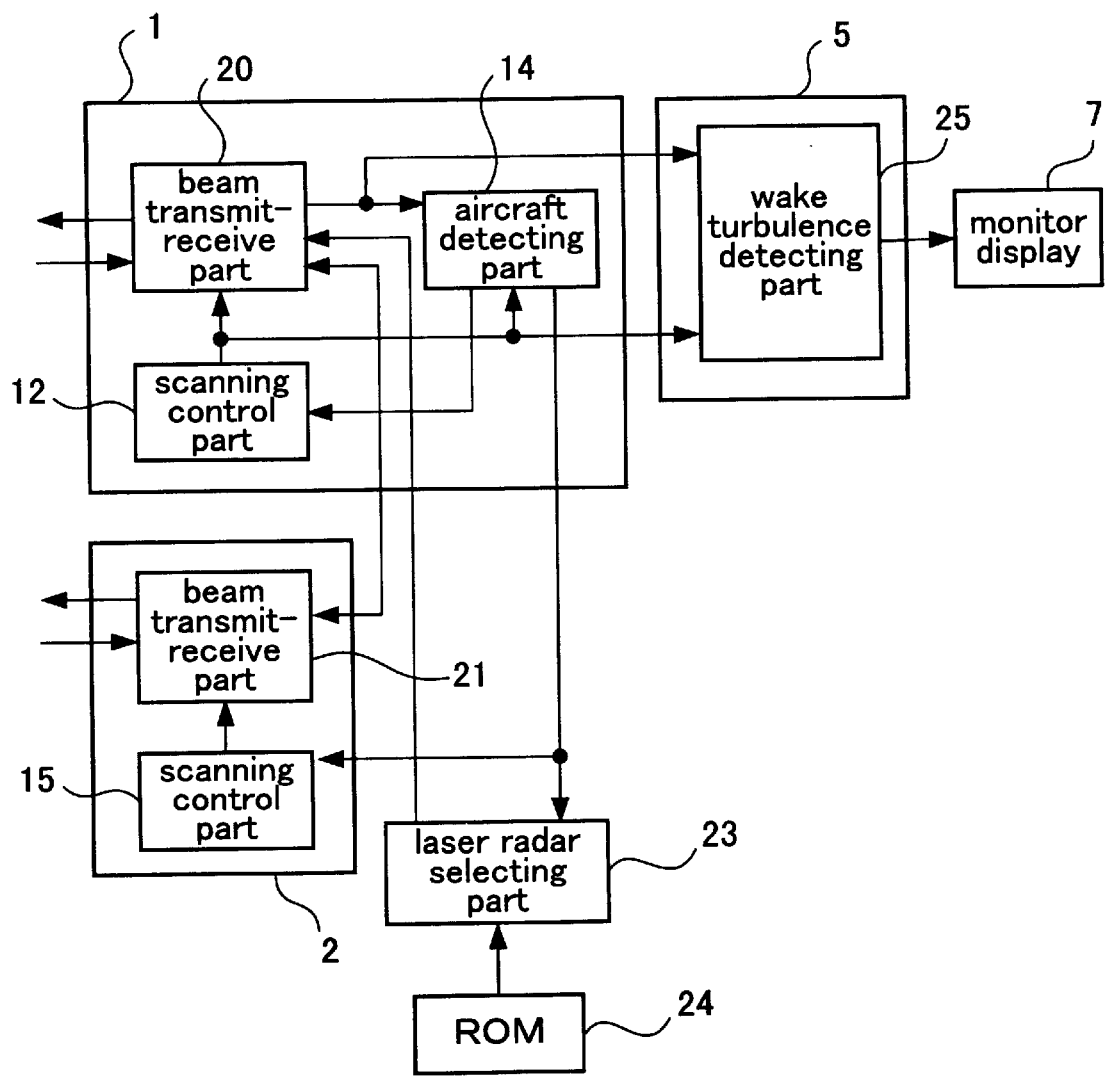
FIG. 8 is a block diagram which shows constitution of a wake turbulence detecting system related to the second embodiment of the present invention.

FIG. 8 is a block diagram which shows constitution of a wake turbulence detecting system related to the second embodiment. In FIG. 8, reference number 23 denotes laser radar selecting part which selects either first laser radar 1 or second laser radar 2 for detecting the wake turbulence. Reference number 24 denotes memory means, in which is stored blind spots of first laser radar 1 and second laser radar 2. Reference number 25 denotes turbulence detecting part which detects wake turbulence from a reception signal of the selected laser radar by means of laser radar selecting part 23. In FIG. 8, the explanation of the same reference number as in FIG. 3 are omitted because they show equivalent or identical parts.

Figure 9:
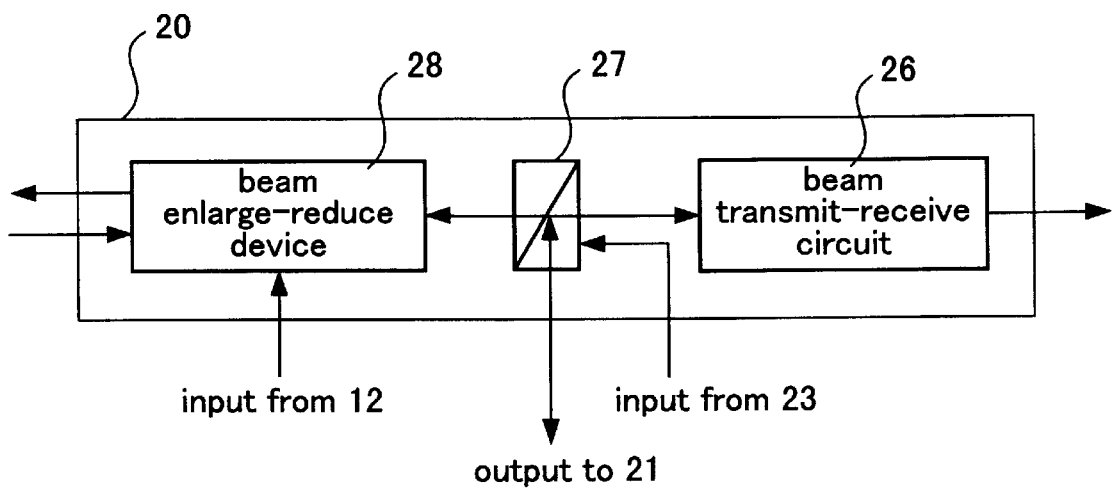
FIG. 9 is a block diagram which shows detailed constitution of beam transmitter-receiver unit.
Figure 10:
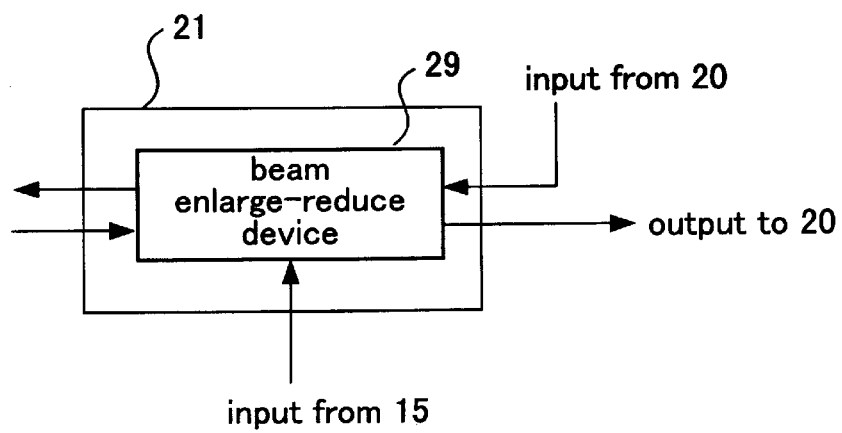
FIG. 10 is a block diagram which shows detailed constitution of beam transmitter-receiver unit.

FIG. 9 is a block diagram to show constitution of beam transmitter-receiver unit 20 including first laser radar 1 shown in FIG. 8. In FIG. 9, reference number 26 denotes a beam transmit-receive circuit which excites laser beam and produces a reception signal converted to an electric signal including Doppler information indicating the behavior of dusts or solids in the atmosphere and beam intensity information indicating the intensity of the reflected laser beam. Reference number 27 denotes beam isolator which switches output destination of a laser beam from beam transmit-receive circuit 26 in response to the switching control signal from laser radar selecting part 23. Reference number 28 denotes beam enlarge-reduce device which enlarges the width of laser beam from beam transmit-receive circuit 26 and reduces the beam width of reflected laser beam. FIG. 10 is a block diagram which shows constitution of beam transmitter-receiver unit 21 comprising the second laser radar shown in FIG. 8. Reference number 29 denotes beam enlarge-reduce device which enlarges the beam width of the laser beam diffracted with beam isolator 27 of beam transmitter-receiver unit 20 and reduces the beam width of the reflected laser beam.

Referring now to FIGS. 8, 9 and 10, the operation of the system is described as follows. In FIG. 8, scanning control part 12 of first laser radar 1 generates scanning control signal for scanning sequentially over the predetermined observation area and outputs the scanning control signal to beam transmitter-receiver unit 20, aircraft position detecting part 14 and wake turbulence detecting part 25. Beam transmitter-receiver unit 20, based on scanning control signal transmitted from scanning control part 12, emits laser beam from first laser radar 1 adjusting the irradiating direction and the irradiating gun elevation angle of the laser beam. Beam transmitter-receiver unit 20 outputs a reception signal generated from reflected laser beam input to aircraft position detecting part 14 and wake turbulence detecting part 25 of signal processing device 5. Wake turbulence detecting part 25 generates wake turbulence information from a reception signal and outputs turbulence information to monitor display 7 as display data. Aircraft position detecting part 14 calculates the aircraft position, based on a reception signal transmitted from beam transmitter-receiver unit 20. Aircraft position information showing the calculated position of the aircraft is output to laser radar selecting part 23 and scanning control part 15 of second laser radar 2.

In memory means 24, blind spot information showing blind spots and the position of each laser radar is stored. Laser radar selecting part 23, based on the aircraft position transmitted by aircraft position detecting part 14 and the blind spot position information read from memory means 24, determines whether the aircraft has arrived at the blind spot of first laser radar 1 or second laser radar 2. As a result, observation of wake turbulence by first laser radar 1 is continued when the aircraft has not yet arrived at the blind spot of first and second laser radar 1, 2. However, if the aircraft is judged coming near to the blind spot of first laser radar 1, that is, the one currently observing the wake turbulence, laser radar selecting part 23 determines to switch the laser radar for observing the wake turbulence from first laser radar 1 to second laser radar 2 and outputs a switching signal to beam transmitter-receiver unit 20 of first laser radar 1.

Beam isolator 27 is controlled based on a switching control signal transmitted from laser radar selecting part 23. Beam isolator 27 switches the path of the laser beam output from beam transmit-receive circuit 26 to cause second laser radar 2 directed by the switching control signal to output laser beam. Thus, the laser beam from beam transmit-receive circuit 26 is input to beam transmitter-receiver unit 21 of second laser radar 2 and enlarges its beam width by means of beam enlarge-reduce device 29. On the other hand, scanning control part 15 of second laser radar 2, produces scanning control signal for scanning a beam over the predetermined azimuth i.e. for example a range of ±5 degrees centering on the aircraft position, based on aircraft position information transmitted from aircraft position detecting part 14. Generated scanning control signals are output to beam transmitter-receiver unit 21 respectively. Beam enlarge-reduce device 29 of beam transmitter-receiver unit 21, irradiates laser beam toward the aircraft direction adjusting the irradiating direction and the irradiating gun elevation angle of the laser beam for scanning laser beam over the predetermined area centered around the aircraft based on scanning control signal. Thus, the laser radar observing the wake turbulence is switched from first laser radar 1 to second laser radar 2.

Laser beam irradiated from second laser radar 2 is reflected back by dusts or solids in the atmosphere. The reflected laser beam reflected back by dusts or solids in the atmosphere is input to transmitter-receiver unit 21 of second laser radar 2. Enlarge-reduce device 29 of beam transmitter-receiver unit 21 reduces beam width of the reflected laser beam input and transmits the reflected laser beam to beam transmitter-receiver unit 20 of the first laser radar. The reflected laser beam transmitted to beam transmitter-receiver unit 20 is input to beam transmit-receive circuit 26 via beam isolator 27. Beam transmit-receive circuit 26 generates a reception signal converted to an electric signal including Doppler information indicating the behavior of dusts or solids in the atmosphere and beam intensity information indicating the intensity of the reflected laser beam. The reception signal is output to aircraft position detecting part 14 and wake turbulence detecting part 25 of signal processing device 5. Aircraft position detecting part 14 detects the aircraft position from the reception signal transmitted by beam transmitter-receiver unit 20 so that the aircraft position information is output to laser radar selecting part 23. Laser radar selecting part 23 judges whether the aircraft is coming near to the blind spot of second laser radar 2 and selects the laser radar for observing the wake turbulence. Wake turbulence detecting part 25 generates wake turbulence information from a reception signal output from beam transmitter-receiver unit 20. The wake turbulence information is output to monitor display 7 as display data. Wake turbulence detecting system as described above switches the laser radar for observing the wake turbulence selectively according to the aircraft position. Second laser radar 2 is subordinate to first laser radar 1 in that it is employed auxiliarily when the aircraft is located in a blind spot of first laser radar 1. Therefore, by using the laser radar suited best for observation in accordance with the aircraft position, observation of the wake turbulence is made possible and the blind spot that disturbs the observation of the wake turbulence is reduced. In addition, beam transmitter-receiver unit 21 of second laser radar 2 is not provided with a beam transmit-receive circuit generating a laser beam. Therefore, constitution of second laser radar 2 is simplified in comparison with that of first laser radar 1 and it becomes easy to install additional laser radar.

Figure 11:
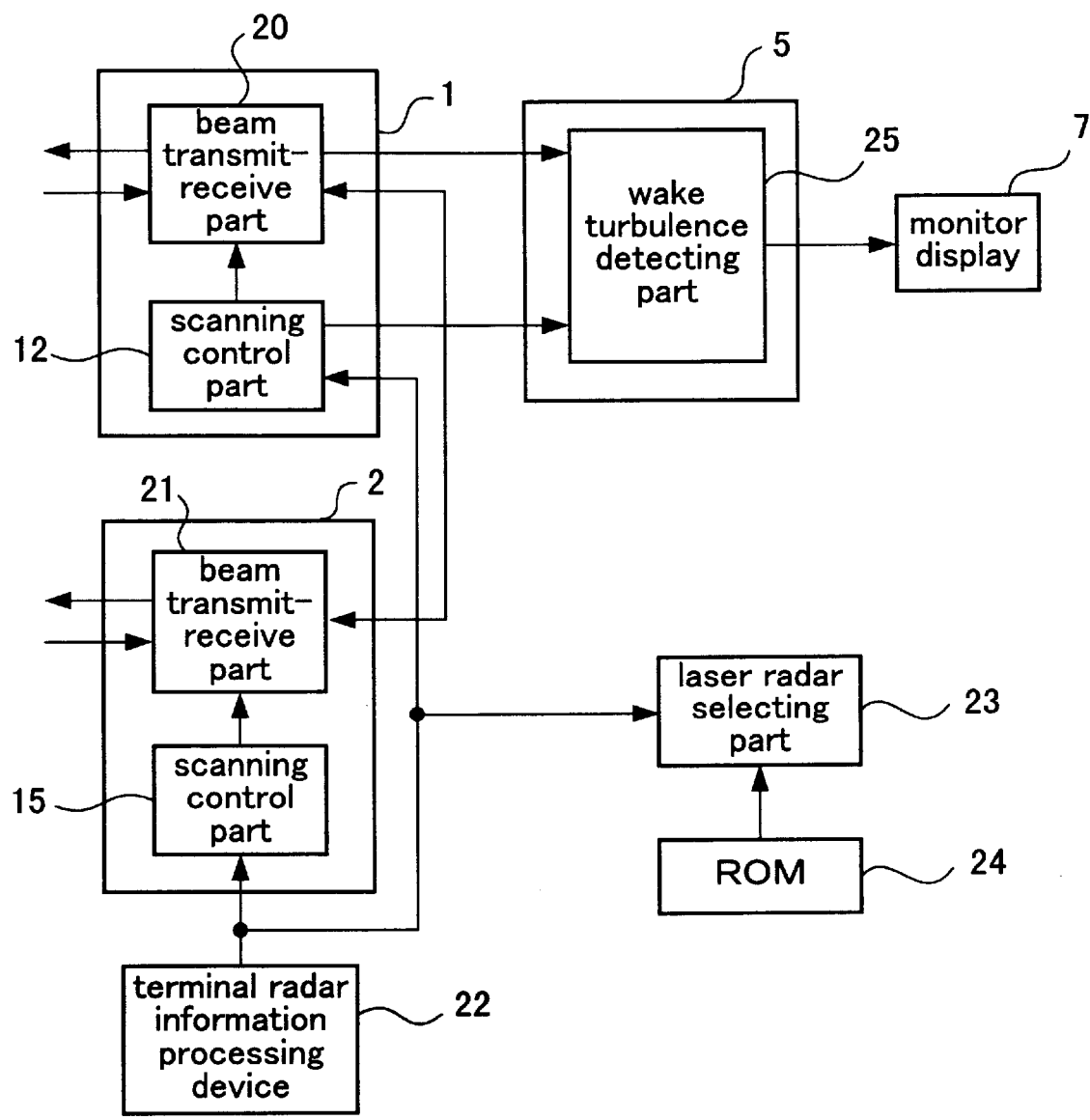
FIG. 11 is a block diagram which shows constitution of a wake turbulence detecting system related to the second embodiment of the present invention.
Figure 12:
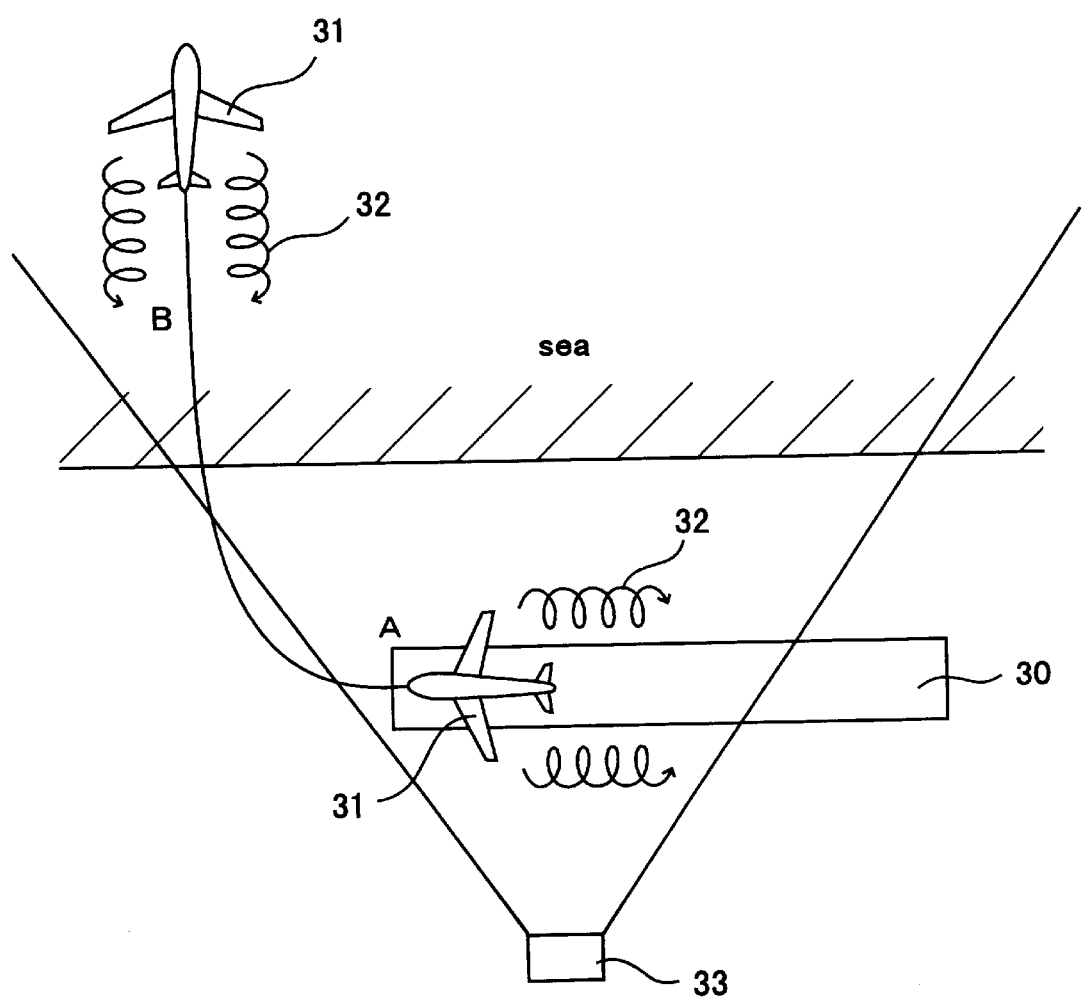
FIG. 12 shows an illustration to explain a blind spot of the laser radar.
Figure 13:
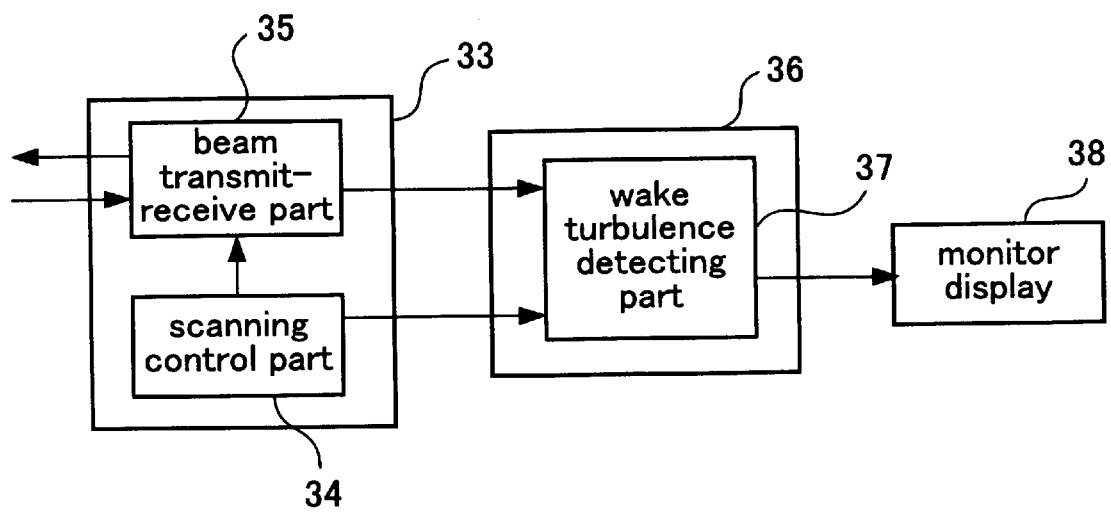
FIG. 13 shows a block diagram explaining constitution of a conventional wake turbulence detecting system.
Figure 14:
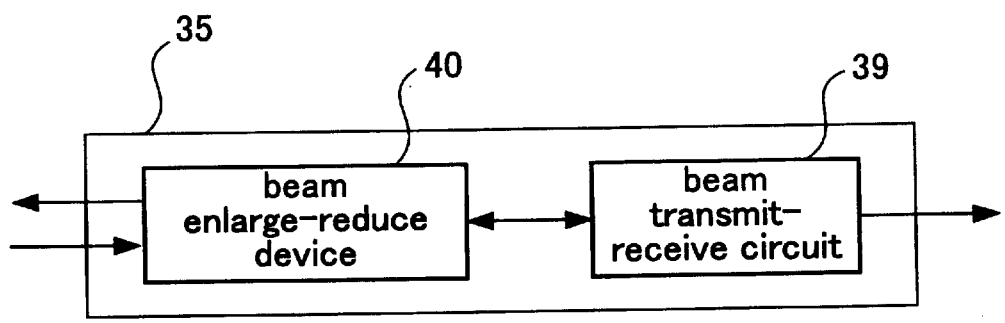
FIG. 14 is a block diagram which shows detailed constitution of beam transmitter-receiver unit.

Further, the wake turbulence detecting system shown in FIG. 8 is comprised of aircraft position detecting part 14 to receive position information of an aircraft caught by first laser radar 1 but the aircraft position information may be acquired from a terminal radar of the airport alternatively. FIG. 11 shows a block diagram explaining a wake turbulence detecting system acquiring aircraft position information from a terminal radar. In FIG. 11, the explanation of the reference numbers the same as in FIG. 8 is omitted because they are equivalent or identical.

The operation of the system is now described hereinafter.

Scanning control part 12 of first laser radar 1 acquires the aircraft position information from terminal radar information processing device 22 and produces scanning control for scanning over the predetermined area centered around the aircraft position. The scanning control signal is output to beam transmitter-receiver unit 20 and turbulence detecting part 25. Beam transmitter-receiver unit 20, based on scanning control signal transmitted from scanning control part 12, irradiates the laser beam from first laser radar 1 adjusting the irradiating direction and the irradiating gun elevation angle of the laser beam and outputs a reception signal generated from the reflected laser beam input to the outer portion of first laser radar 1 and outputs a reception signal generated from the reflected laser beam input to wake turbulence detecting part 25 of signal processing device 5. Wake turbulence detecting part 25 generates wake turbulence information from the reception signal and a turbulence information is output to monitor display 7 as display data.

While first laser radar 1 observes wake turbulence, laser radar selecting part 23, based on aircraft position information acquired from terminal radar information processing device 22 and the blind spot position information read from memory means 24, judges whether the aircraft has arrived at a blind spot of first laser radar 1 or second laser radar 2. As a result, if it is determined that the aircraft is arriving at a blind spot of first laser radar 1, laser radar selecting part 23 determines to switch the laser radar for observing wake turbulence from first laser radar 1 to the second laser radar 2 and outputs switching control signal to beam transmitter-receiver unit 20 of first laser radar 1. Beam transmitter-receiver unit 20, based on switching control signal transmitted from laser radar selecting part 23, switches the beam path of the laser beam output from transmit-receive circuit 26 and cause second laser radar 2 to output laser beam. The laser beam input to beam transmitter-receiver unit 21 of second laser radar 2 is enlarged in beam width by beam enlarge-reduce device 29. Scanning control part 15 of second laser radar 2, based on aircraft position information acquired from terminal radar information processing device 22, generates scanning control signal for beam scanning over the predetermined area centered around the aircraft. Beam transmitter-receiver unit 21, based on scanning control signal, emits laser beam toward the aircraft adjusting the irradiating direction and the irradiating gun elevation angle of the laser beam.

The reflected laser beam reflected back by dusts or solids in the atmosphere is input to beam transmitter-receiver unit 21 of second laser radar 2. Beam enlarge-reduce device 29 of beam transmitter-receiver unit 21 reduces the beam width of the input reflected laser beam and transmits the reflected laser beam to beam transmitter-receiver unit 20 of the first laser radar. The reflected laser beam transmitted to beam transmitter-receiver unit 20 of the first laser radar is transmitted to beam transmit-receive circuit 26 via beam isolator 27. Subsequently, the operation for producing reception signal from reflected laser beam, the operation for producing wake turbulence information from reception signal and the operation for displaying wake turbulence information are processed.

In the wake turbulence detecting system shown in FIG. 8, it is required to scan a beam over a predetermined area for detecting the aircraft position until it is detected. However, as for the wake turbulence detecting system shown in FIG. 11, since aircraft position information is obtained from terminal radar information processing device 22, beam scanning over the observation area centered around the aircraft is made possible from the beginning of the observation.

What is claimed is:

1. Wake turbulence detecting system comprising:
   first laser radar located close to a runway, said first laser radar including
      a laser transmitter-receiver unit emitting laser beam toward an aircraft taking off or landing on said runway and receiving reflected laser beam reflected back by aerosol floating in the atmosphere where said laser beam is irradiated and scattering said laser beam, and
      a scanning control part controlling the irradiating direction of the laser beam irradiated from said laser transmitter-receiver unit;
   second laser radar located at a position differing from that of said first laser radar, said second laser radar including
      a laser transmitter-receiver unit irradiating laser beam toward an aircraft taking off or landing on said runway and receiving reflected laser beam reflected back by aerosol floating in the atmosphere where said laser beam is irradiated and scattering said laser beam, and
      a scanning control part controlling the irradiating direction of the laser beam irradiated from said laser transmitter-receiver unit; and
   a signal processing device producing first wake turbulence information on the area irradiated by the first laser beam based on the reflection of the light emitted by the first laser radar including the magnitude, the wind velocity and the origin of the wake turbulence, and producing second wake turbulence information including the scale, the wind velocity and the birth place of the wake turbulence in the area where said second laser beam is irradiated based on reflection of light emitted by the second laser radar, and indicating the wake turbulence information of the area where the irradiation of said first and said second laser radar do not overlap each other by making a composite of said first and second wake turbulence information, and indicating the wake turbulence information of the area where the irradiation of said first and second laser radar overlap each other by comparing said first wake turbulence information with second wake turbulence information to select the one having a larger value.

2. Wake turbulence detecting system according to claim 1 wherein said first laser radar comprising:
   a scanning control part generating scanning control signal for controlling laser transmitter-receiver unit to scan laser beam over a predetermined area so as to detect the aircraft position,
   characterized in that an aircraft position detecting part detecting aircraft position from the reflected laser beam reflected back by aerosol floating in the atmosphere where said laser beam is irradiated from said laser transmitter-receiver unit in response to scanning control signal from said scanning control part, and outputs aircraft position information indicating the aircraft position to aircraft position detecting part of said second laser radar, second laser radar in this way being directed to irradiate laser beam to the area centered around said aircraft position.

3. Wake turbulence detecting system according to claim 2 wherein said first laser radar generates scanning control signal for controlling laser transmitter-receiver unit to scan laser beam over the area centered around aircraft position based on said aircraft position information from said aircraft position detecting part, and switches the operation of said laser transmitter-receiver unit to scan laser beam from a predetermined area to a certain area centered around said aircraft.

4. Wake turbulence detecting system according to claim 1 wherein said second laser radar generates scanning control signal for controlling laser transmitter-receiver unit to scan laser beam over the area centered around aircraft position based on said aircraft position information from aircraft position detecting radar deployed in the airport for detecting aircraft position.

5. Wake turbulence detecting system according to claim 4 wherein said first laser radar is composed of a scanning control part for controlling laser transmitter-receiver unit to scan laser beam over the area centered around aircraft position based on said aircraft position information acquired from said aircraft position detecting radar.

6. Wake turbulence detecting system according to claim 1 wherein said signal processing device produces indicating signal by a process of matching the position of wake turbulence to airport map for indicating the position of a wake turbulence observed at corresponding point on said airport map.

7. Wake turbulence detecting system according to claim 6 wherein said signal processing device compares the size of the aircraft having generated the wake turbulence with the size of following aircraft based on the information of indicating the size of the aircraft input from outside sources, and judges the influence exerted on the following aircraft to produce warning signal, and indicates on monitor display said warning signal, which differs according to whether said influence exerted on the following aircraft is great or small.

8. Wake turbulence detecting system according to claim 7 wherein said signal processing device forecasts the position and the magnitude of change of the wake turbulence with the passage of time based on the latest weather data input from outside sources and updates said warning signal and the position of the wake turbulence on the map indicated on monitor display according to the forecast.

9. Wake turbulence detecting system comprising:
   first laser radar located close to a runway, said first laser radar including
      a laser transmit-receive circuit generating laser beam irradiated to the atmosphere and receiving reflected laser beam reflected back by aerosol floating in the atmosphere,
      a beam enlarge-reduce device enlarging the width of laser beam output from said laser transmitter-receiver unit to adjust the irradiating direction of said laser beam and reducing the width of said reflected laser beam,
      a laser transmitter-receiver unit having a beam isolator provided between said laser transmit-receive circuit and said beam enlarge-reduce device to switch the path of laser beam output from said laser transmitter-receiver unit, and
      a scanning control part producing scanning control signal to control the direction of laser beam output from said laser transmitter-receiver unit for controlling said beam enlarge-reduce device in response to said scanning control signal;
   second laser radar including a laser transmitter-receiver unit having beam enlarge-reduce device which enlarges the width of laser beam generated by said laser transmitter-receiver unit input after its path is switched by said beam isolator and emits the laser beam to the atmosphere adjusting the irradiating direction and reduces the width of reflected laser beam to output to laser transmit-receive circuit of said first laser radar, and a scanning control part producing scanning control information to control irradiating direction of laser beam irradiated by said laser transmitter-receiver unit and for controlling said beam enlarge-reduce device in response to said scanning control signal;

a signal processing device producing wake turbulence information including the magnitude, the wind velocity and the position of the wake turbulence and producing display signals for indicating said wake turbulence information on monitor display; and a laser radar selecting part controlling said beam isolator based on aircraft position information and position information read from memory means storing blind spot information of said first and second laser beam and which switches the laser beam excited by said laser transmitter-receiver unit selectively to either said first or second laser radar.

10. Wake turbulence detecting system according to claim 9 wherein said signal processing device produces display signal by a process of matching the position of wake turbulence to airport map for indicating the position of a wake turbulence observed at corresponding point on said airport map.

11. Wake turbulence detecting system according to claim 10 wherein said signal processing device compares the size of the aircraft having generated the wake turbulence with the size of following aircraft based on the information of indicating the size of the aircraft input from outside, judges the influence exerted on the following aircraft to produce warning signal and displays said warning signal which differs according to whether said influence exerted on the following aircraft is great or small.

12. Wake turbulence detecting system according to claim 11 wherein said signal processing device forecasts the position and the magnitude change of the wake turbulence with the passage of time based on the latest weather data input from outside sources and updates said warning signal and the position of the wake turbulence on the map indicated on monitor display according to the forecast.

* * * * *